United States Patent
Thorn

(10) Patent No.: US 9,708,068 B2
(45) Date of Patent: Jul. 18, 2017

(54) CUSHION ASSEMBLY

(71) Applicants: OAKTHRIFT CORPORATION LTD, Hertfordshire (GB); James John Thorn, East Sussex (GB)

(72) Inventor: James John Thorn, East Sussex (GB)

(73) Assignee: OAKTHRIFT CORPORATION LTD. (GB)

( * ) Notice: Subject to any disclaimer, the term of this patent is extended or adjusted under 35 U.S.C. 154(b) by 0 days.

(21) Appl. No.: 15/008,036

(22) Filed: Jan. 27, 2016

(65) Prior Publication Data

US 2016/0221679 A1    Aug. 4, 2016

(51) Int. Cl.
*A47C 31/11*    (2006.01)
*B64D 11/06*    (2006.01)
*A47G 9/02*    (2006.01)

(52) U.S. Cl.
CPC ........ *B64D 11/0647* (2014.12); *A47G 9/0223* (2013.01); *B64D 11/0646* (2014.12)

(58) Field of Classification Search
CPC ............ B64D 11/0644; B64D 11/0646; B64D 11/0647; A47G 9/0223
USPC ............................................... 297/219.1–227
See application file for complete search history.

(56) References Cited

U.S. PATENT DOCUMENTS

| | | | | |
|---|---|---|---|---|
| 4,190,918 A * | 3/1980 | Harvell | ..................... | A47C 4/52 297/219.1 X |
| 4,285,544 A * | 8/1981 | Zapf | ........................ | A47C 3/16 297/227 X |
| 5,700,053 A * | 12/1997 | Downing | ................ | A47C 7/546 297/227 |
| 5,806,925 A * | 9/1998 | Hanley | ................ | A47C 31/113 297/219.1 |
| 6,764,134 B1 * | 7/2004 | Crescenzi | .............. | A47C 31/00 297/219.1 X |
| 7,431,396 B1 * | 10/2008 | Dasso | ..................... | A47C 7/546 297/227 |
| 2002/0130538 A1 * | 9/2002 | Artsvelyan | .......... | B60N 2/4673 297/227 |
| 2010/0139001 A1 * | 6/2010 | Mangano | ................ | A47C 7/383 297/229 X |
| 2010/0140993 A1 * | 6/2010 | DePasquale | ........... | A47C 31/11 297/220 |
| 2012/0193958 A1 * | 8/2012 | DePasquale | ........... | A47C 31/11 297/228.11 |
| 2013/0147245 A1 * | 6/2013 | Torres | ...................... | B60N 2/58 297/227 |
| 2013/0187415 A1 * | 7/2013 | Shelley | .................. | A47C 31/11 297/219.1 X |

(Continued)

FOREIGN PATENT DOCUMENTS

GB    2171900 A *  9/1986  ................ A47G 9/02

*Primary Examiner* — Rodney B White
(74) *Attorney, Agent, or Firm* — Weiss & Moy, P.C.; Jeffrey D. Moy

(57) ABSTRACT

A cushion assembly has a main body comprising a plurality of walls defining an interior cavity that is substantially polygonal in cross-section. At least one of the walls comprises an area of padding. A first opening to the cavity is located at a first end of the main body. A blanket is housed within the cavity and is removable from the main body. The cavity is adapted to house a vehicle armrest when the blanket is removed therefrom such that at least an upper surface of the armrest is at least partly covered by a wall having an area of padding.

14 Claims, 4 Drawing Sheets

(56) References Cited

U.S. PATENT DOCUMENTS

2013/0341979 A1\* 12/2013 Girard .................... A47C 7/021
　　　　　　　　　　　　　　　　　　297/227

\* cited by examiner

CUSHION ASSEMBLY

The present invention relates to a cushion assembly.

Travelling on public transport frequently results in a person attempting to sleep in a chair. This is particularly problematic on long haul flights and coach journeys and can be distressing for children.

The present invention seeks to address these issues.

According to a first aspect of the present invention there is provided a cushion assembly having:
- a main body comprising a plurality of walls defining an interior cavity that is substantially polygonal in cross-section;
- at least one of the walls comprising an area of padding;
- a first opening to the cavity located at a first end of the main body;
- a blanket housed within the cavity and removable from the main body;

wherein:
- the cavity is adapted to house a vehicle armrest when the blanket is removed therefrom such that at least an upper surface of the armrest is at least partly covered by a wall having an area of padding.

By providing a cushion assembly as defined above a user is able not only to use the main body to pad the upper surface of a vehicle armrest so as to use it as a pillow but is also provided with a blanket for warmth. By providing a main body with a cavity that is substantially polygonal in cross section the main body of the cushion assembly is hindered from rotating on an armrest when in use, thereby maintaining an area of padding in a position desired by a user.

In some embodiments the main body comprises padding on at least two adjacent walls.

By providing padding on two adjacent walls of the main body a user is able to pad both the upper surface of an armrest and also one side of the armrest so as to form a more effective pillow.

In some embodiments the main body comprises padding on at least three adjacent walls.

By providing padding on three adjacent walls a user is able to pad both the upper surface of an armrest and also both sides of the armrest.

In some embodiments the main body has four walls defining a cavity that is substantially rectangular in cross-section.

A rectangular cross-section is ideal for housing vehicle armrests, as such armrests are typically rectangular in cross section.

In some embodiments the main body is substantially rectangular in cross-section and comprises padding on all four walls.

By providing padding on all four walls all sides of an armrest will be padded regardless of the orientation of the main body.

In some embodiments the main body is substantially rectangular in cross-section and comprises padding on all four walls, wherein one of the walls comprising padding of a greater maximum thickness than each of the other three walls.

By providing one wall with thicker padding than the other three walls a user may provide most padding to the upper surface of an armrest (if desired) and whilst the other parts of the armrest are padded the bulk of the main body is reduced, aiding transportation.

In some embodiments the main body is substantially rectangular in cross-section and comprises padding on all four walls, wherein a first pair walls each comprise padding of a greater maximum thickness than a second pair of walls.

In some embodiments the first pair of walls are adjacent each other.

By providing two walls with thicker padding adjacent each other then the user may pad the upper surface and a chosen side of the armrest.

In some embodiments the first pair of walls are opposing.

By providing two walls with thicker padding opposing each other a user may position the main body on an armrest in two different but otherwise identical orientations, thereby aiding deployment of the main body.

In some embodiments one pair of opposing walls are greater in width than the other pair of opposing walls such that the cavity is oblong in cross section.

By providing a cavity that is an oblong rectangle in cross section the main body provides greater resistance to rotation when positioned on a vehicle armrest.

Preferably the walls of the main body are hingedly attached to each other.

Preferably the cavity is of a size that the blanket is substantially snugly housed within the cavity.

By snugly housing the blanket inside the cavity it will not fall out of the main body during transportation.

In some embodiments the main body comprises a second opening to the cavity at a second end.

By providing a second opening a user may insert an armrest into the cavity from either end. Furthermore, depending upon the dimensions of the main body an armrest may be extended all of the way through the main body so as to leave exposed a seat reclining button found adjacent the end of the armrest.

In some embodiments the cavity comprises a pocket adapted to house an armrest.

In some embodiments the main body comprises an opening that extends between first and second ends and at least one fastening to releasably hold the outer wall in a configuration that defines a cavity.

In some embodiments the main body comprises at least one section of elastic material so as to allow the size of the cavity to resiliently expand.

Provision of at least one section of elastic allows for the main body to both grip a blanket inserted into it and to expand to fit around differently sized armrests.

In some embodiments the main body is substantially rectangular in cross-section having two pairs of opposing walls and wherein:
a first pair of opposing walls each comprise padding;
a second pair of opposing walls each comprise at least one section of elastic material.

In some embodiments a second pair of opposing walls are each formed of an elastic material.

In some embodiments the main body is in the form of a plush toy.

Providing the main body in the form of a plush toy makes the assembly attractive to children.

In some embodiments the assembly comprises at least one strap that is releasably securable over an opening.

According to a second aspect of the present invention there is provided a method of padding a vehicle armrest comprising the steps of:
providing a cushion assembly formed in accordance with any preceding statement of invention;
removing the blanket from the cavity; and
housing a vehicle armrest in the cavity by inserting the armrest into an opening.

In order that the invention may be more fully understood by way of example a specific embodiment will now be described with reference to the accompanying drawings, of which:

Figure 1:
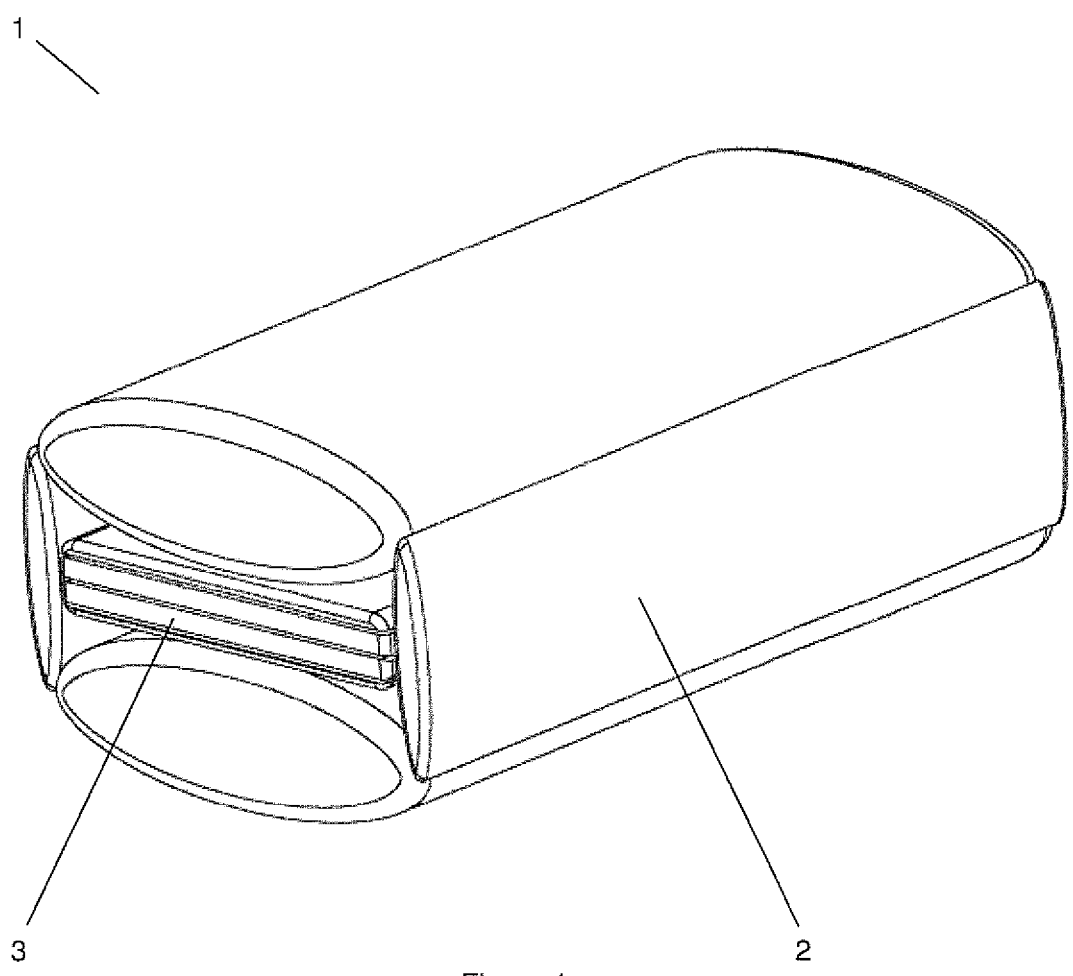
FIG. 1 is a perspective view of a cushion assembly formed in accordance with the present invention and comprising a main body that houses a blanket.
Figure 2:
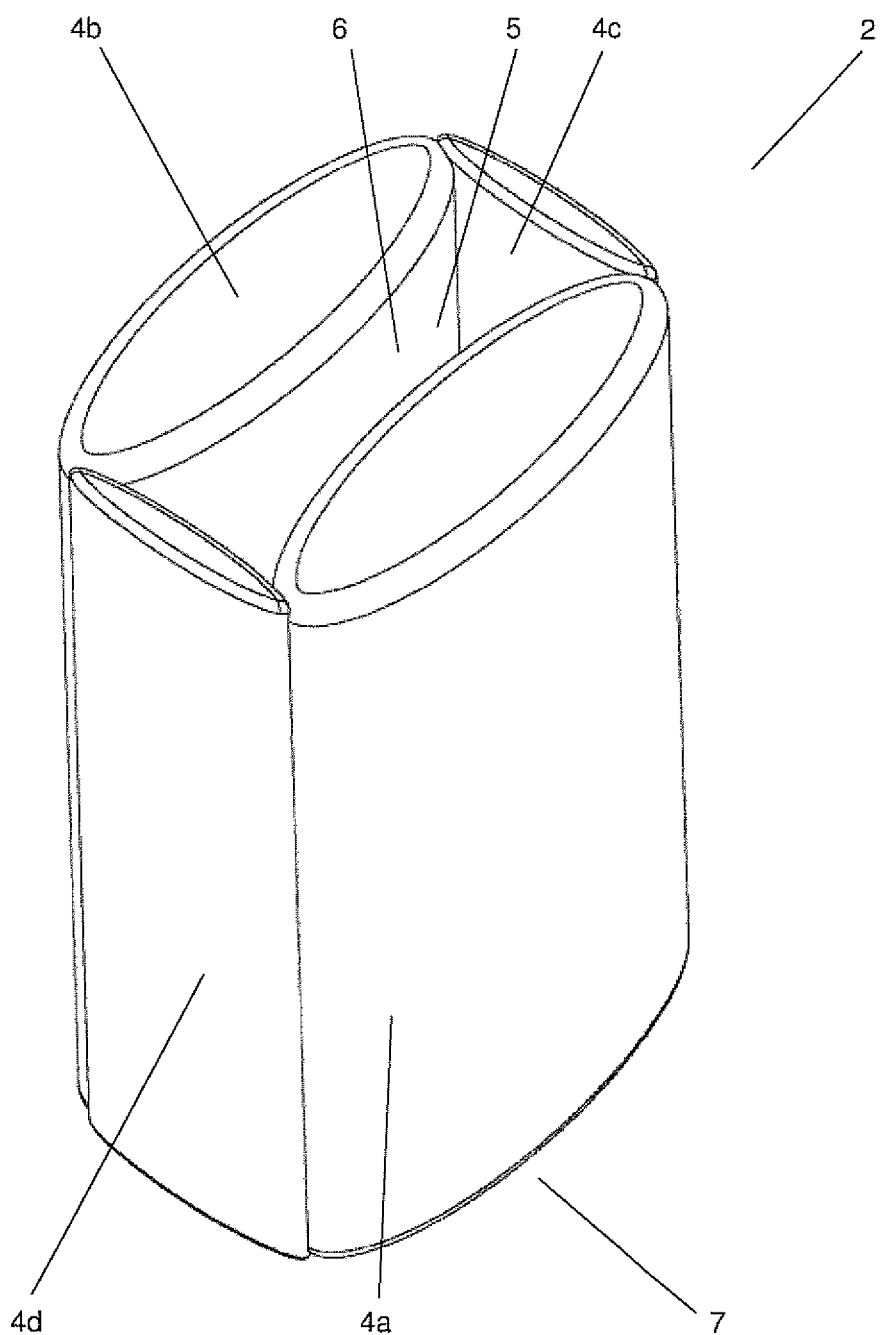
FIG. 2 is a perspective view of the main body of the cushion assembly of FIG. 1.
Figure 3:
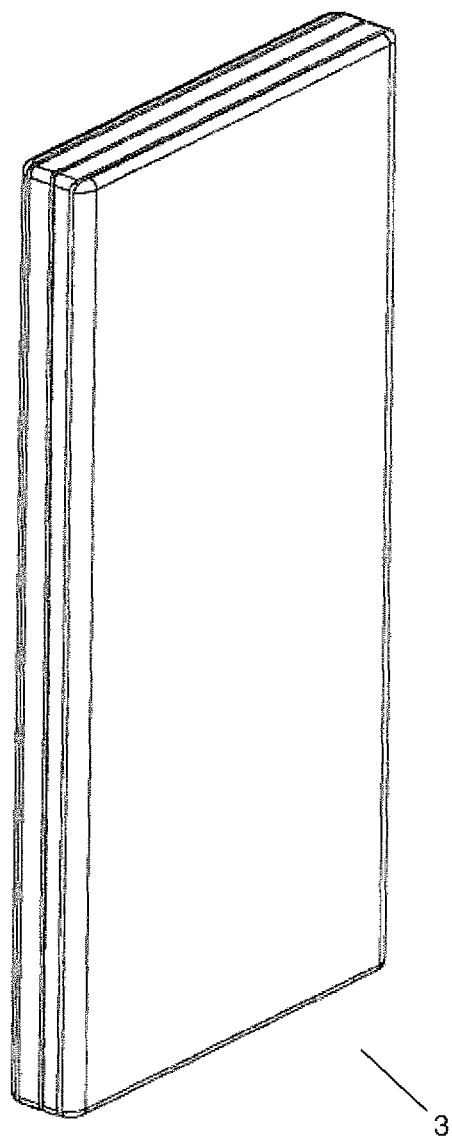
FIG. 3 is a perspective view of the blanket of the cushion assembly of FIG. 1.

Referring to an embodiment of the present invention as illustrated in the Figures, a cushion assembly 1 comprises a main body 2 and a blanket 3.

Main body 2 comprises four substantially rectangular walls 4a, 4b, 4c, 4d, each of which is hingedly attached to adjacent walls resulting main body 2 being substantially a cuboid shape.

Main body 2 is elongate so as to allow for the length of a vehicle armrest to be padded.

In the present embodiment walls 4a, 4b, 4c, 4d are formed of foam panels of padding held within a textile cover that provides the hinged attachments between respective sections. Each of walls 4a, 4b, 4c, 4d are substantially oval in cross-section. The padding of each of walls 4a, 4b, 4c, 4d extends the full length of main body 2 between first and second ends thereof.

First pair of opposing walls 4a, 4b comprise foam panels that measure around 13 cm by 24 cm, and are at their greatest thickness (in the middle of the respective panels) each around 3 cm thick.

Second pair of opposing walls 4c, 4d comprise foam panels that measure around 6 cm by 24 cm are at their greatest thickness (in the middle of the respective panels) each around 1 cm thick.

Blanket 3 is housed within cavity 5 defined by walls 4a, 4b, 4c, 4d. Cavity 5 is of a size to snugly house blanket 3.

Owing to main body 2 having four walls, and owing to first pair of opposing walls 4a, 4b being around 13 wide and second pair of opposing walls 4c, 4d being around 6 cm wide, cavity 5 is a substantially oblong rectangle in cross-section.

Main body 2 has a first opening 6 to cavity 5 at a first end and a second opening 7 to cavity 5 at a second end. Thus main body 1 is substantially tubular.

Figure 4:
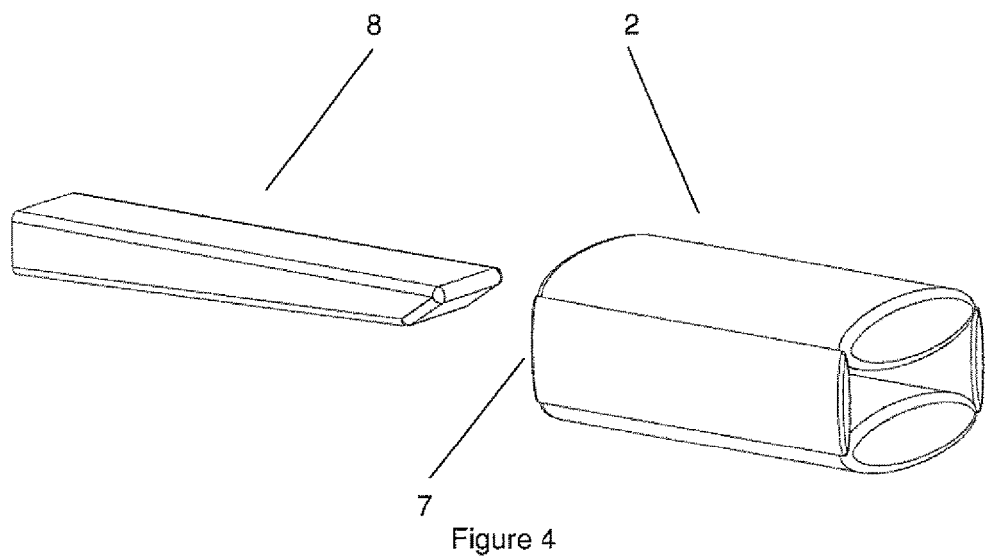
FIG. 4 is a perspective view of the main body of the cushion assembly of FIG. 1 and a vehicle armrest.
Figure 5:
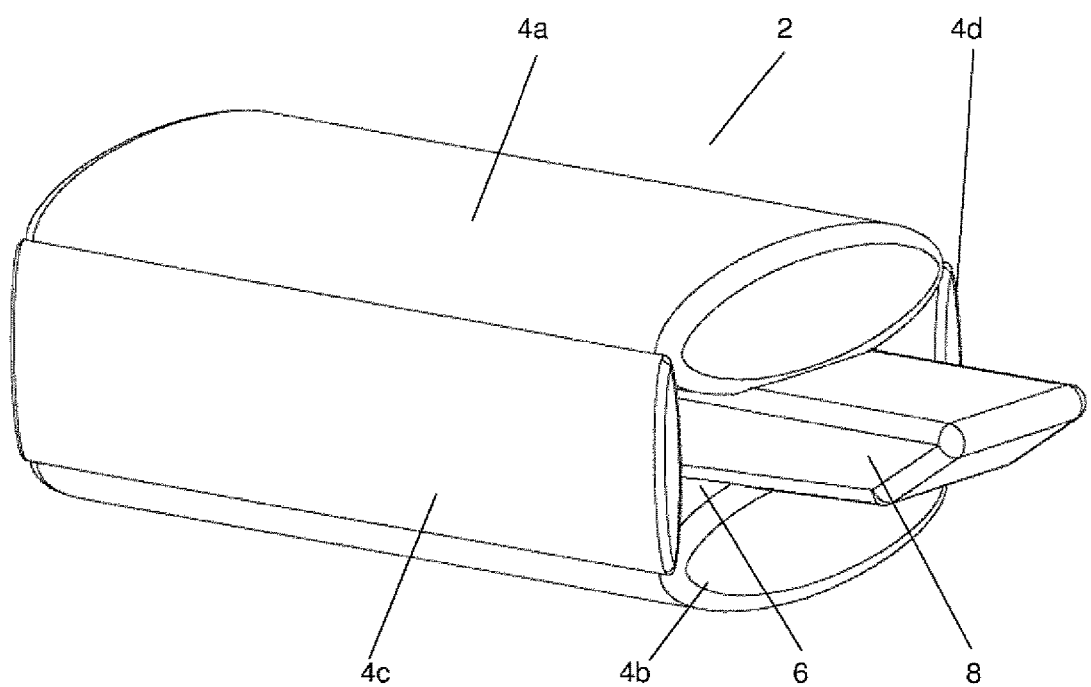
FIG. 5 is a perspective view of the main body of the cushion assembly of FIG. 1 fitted to the vehicle armrest.

As illustrated in FIGS. 4 and 5, in the present embodiment cavity 5 is of a size to snugly house a vehicle armrest 8. In the present embodiment cavity 5 measures approximately 4 cm by 11 cm in cross-section and is around 24 cm in length between first opening 6 and second opening 7.

In use and to deploy cushion assembly 1 a user removes blanket 3 from cavity 5 via either first or second openings 6, 7. The user may then fit main body 2 of cushion assembly 1 to a vehicle armrest 8 by inserting armrest 8 into cavity 5 via either of first or second openings 6, 7.

Main body 2 is positioned such that either wall 4a or wall 4b is uppermost, such that the upper surface of armrest 8 is provided with greater padding than the sides of armrest 8, which are covered by walls 4c, 4d. This allows for the upper surface of armrest 8 to operate as a pillow for a user, and also minimizes the padding that overhangs the seat or seats adjacent to the armrest.

Owing to walls 4a, 4b (those with thicker padding) being wider than second pair of opposing walls 4c, 4d, (those with thinner padding) the main body of the present embodiment is configured to best fit to a vehicle armrest that is of greater width than height.

However, to specifically fit armrests having greater height than width other embodiments may be provided wherein a pair of opposing walls with the thinner padding are of greater width than a pair of opposing walls with thicker padding.

In some embodiments a cavity may be substantially square in cross section so as to be adaptable to armrests having greater height than width and armrests having greater width than height.

Once main body 2 is fitted to armrest 8 a user may then adopt padded upper surface of armrest 8 as a pillow and cover themselves with blanket 3. Owing to cavity 5 being polygonal in cross-section, in the present embodiment substantially rectangular, main body 2 is hindered from rotating, thereby keeping padded walls 4a, 4b, 4c, 4d of main body 2 in a position on armrest 8.

It will be apparent that in other embodiments other polygonal cross sections, such as a triangular cross section or pentagonal cross section would also hinder rotation.

In other embodiments one or more sections of elastic material may be provided in the main body so as to allow the size of a cavity to be increased if necessary to fit over an armrest and to be retained thereon.

In the present embodiment walls 4a, 4b, 4c, 4d are substantially permanently attached to each other so as to always form a tube, but in other embodiments a main body may be provided with a side opening extending between first and second ends of the main body.

The side opening may be releasably held closed by means of one or more fasteners such as, for example, press-studs, hook and loop fastening or a zip. In a closed configuration the main body would be in the form of a tube adapted to house a blanket.

A user may change the main body to an open configuration by undoing the fastener or fasteners so as to convert the main body from a tube into a padded sheet that may be draped over an armrest. Such an arrangement is beneficial, for instance, where an armrest is in the form of a panel and it is not possible to fit a tubular body to the armrest.

In some embodiments a pocket may be provided on an inner wall of a cavity, the pocket being adapted to house an armrest. Such a pocket may be elasticised so as to allow it resiliently expand and retain the device on the armrest.

In some embodiments one or more straps extending across openings to the cavity may be provided so as to prevent a blanket being dislodged from a cushion assembly during transportation.

It should be noted that in this specification the word 'tubular' is not intended to imply a limitation in shape to that of a cylinder. It should be noted that the word 'rectangular' is intended to encompass a square as a type of rectangle.

It should be noted that in this specification the word 'vehicle' is not intended to imply a limitation to land-based vehicles such as buses and coaches, but is intended to incorporate other forms of transport such as aeroplanes and sea-going craft such as ferries.

Many variations are possible without departing from the scope of the present invention as set out in the appended claims.

The invention claimed is:

1. A cushion assembly having:
   a main body comprising a plurality of walls defining an interior cavity that is substantially polygonal in cross-section;
   at least one of the walls comprising an area of padding; a first opening to the cavity located at a first end of the main body;
   a blanket snugly housed within the cavity and removable from the main body;
   wherein:
   the cavity is adapted to house a vehicle armrest when the blanket is removed therefrom such that at least an upper surface of the armrest is at least partly covered by one of the walls having an area of padding;
   wherein:
   the main body is substantially rectangular in cross-section and comprises padding on all four walls, wherein a first pair of walls each comprise padding of a greater maximum thickness than a second pair of walls.

2. The cushion assembly of claim 1 wherein the first pair of walls are adjacent to each other.

3. The cushion assembly of claim 1 wherein the first pair of walls are opposing.

4. The cushion assembly of any of claim 1 wherein one pair of opposing walls are greater in width than the other pair of opposing walls such that the cavity is oblong in cross section.

5. The cushion assembly of claim 1 wherein the walls of the main body are hingedly attached to each other.

6. The cushion assembly of claim 1 wherein the cavity is of a size that the blanket is substantially snugly housed within the cavity.

7. The cushion assembly of claim 1 wherein the main body comprises a second opening to the cavity at a second end.

8. The cushion assembly of claim 1 wherein cavity comprises a pocket adapted to house an armrest.

9. The cushion assembly of claim 1 wherein the main body comprises an opening that extends between first and second ends and at least one fastener to releasably hold the outer wall in a configuration that defines a cavity.

10. The cushion assembly of claim 1 wherein the main body comprises at least one section of elastic material so as to allow the size of the cavity to resiliently expand.

11. The cushion assembly of claim 1 wherein the second pair of opposing walls each comprise at least one section of elastic material.

12. The cushion assembly of claim 11 wherein the second pair of opposing walls are each formed of an elastic material.

13. The cushion assembly of claim 1 wherein the assembly comprises at least one strap that is releasably securable over an opening.

14. A method of padding a vehicle armrest comprising the steps of: providing a cushion assembly formed in accordance with claim 1:
   removing the blanket from the cavity; and
   housing a vehicle armrest in the cavity by inserting the armrest into an opening.

* * * * *